US012357999B2

(12) United States Patent
Martin

(10) Patent No.: US 12,357,999 B2
(45) Date of Patent: Jul. 15, 2025

(54) WOOD CHIPPER

(71) Applicant: FOREST MASTER LIMITED, Whitley Bay Tyne and Wear (GB)

(72) Inventor: Andrew Martin, Whitley Bay Tyne and Wear (GB)

( * ) Notice: Subject to any disclaimer, the term of this patent is extended or adjusted under 35 U.S.C. 154(b) by 297 days.

(21) Appl. No.: 18/000,023

(22) PCT Filed: May 24, 2021

(86) PCT No.: PCT/IB2021/054494
§ 371 (c)(1),
(2) Date: Nov. 28, 2022

(87) PCT Pub. No.: WO2021/240347
PCT Pub. Date: Dec. 2, 2021

(65) Prior Publication Data

US 2023/0211354 A1 Jul. 6, 2023

(30) Foreign Application Priority Data

May 28, 2020 (GB) ...................................... 2008049

(51) Int. Cl.
*B02C 18/14* (2006.01)
*B02C 18/22* (2006.01)

(52) U.S. Cl.
CPC .......... *B02C 18/2291* (2013.01); *B02C 18/14* (2013.01); *B02C 18/2216* (2013.01)

(58) Field of Classification Search
CPC .......... B27L 11/00; B27L 11/02; B27L 11/06; B27L 11/08; B02C 18/2291
See application file for complete search history.

(56) References Cited

U.S. PATENT DOCUMENTS 3,819,121 A * 6/1974 Rogers .................... B27L 11/02
241/278.1
4,062,498 A 12/1977 Szepaniak
4,544,104 A 10/1985 Carlsson
5,293,917 A 3/1994 Kalliokoski
7,878,434 B2 * 2/2011 Grant .................. B02C 18/2225
241/101.76

(Continued)

FOREIGN PATENT DOCUMENTS

DE 2507083 B1 6/1976
DE 3209873 A1 9/1983
DE 3729384 A1 3/1989

OTHER PUBLICATIONS

Machine Translation for DE2507083 (B1).

(Continued)

*Primary Examiner* — Matthew Katcoff

(57) ABSTRACT

A chipper includes a hopper and a chipper unit. The hopper is configured to receive vegetative debris via an inlet end. The chipper unit has an outer casing and an inlet passing therethrough. The inlet of the chipper unit is connected to the outlet end of the hopper to in use receive the vegetative debris within the outer casing. The chipper unit includes a cutter located which is configured to chip vegetative debris. The hopper and the outer casing are configured so that the hopper and outer casing can be moved between a position where the hopper is substantially vertical and a position where the hopper is substantially horizontal.

17 Claims, 6 Drawing Sheets

(56) References Cited

U.S. PATENT DOCUMENTS

2006/0024457 A1* 2/2006 O'Leary ............... E04F 21/085
428/34.1

OTHER PUBLICATIONS

Machine Translation for DE3209873 (A1).
Machine Translation for DE3729384 (A1).
International Search Report and Written Opinion for PCT/IB2021/054494 mail date Oct. 18, 2021, 8 pages.

* cited by examiner

WOOD CHIPPER

FIELD

The present invention relates to a wood chipper. More particularly, the present invention relates to a wood chipper with an adjustable feed hopper.

BACKGROUND

Wood chippers are well known as an apparatus used to process fallen or cut branches and/or similar debris or refuse (vegetative debris), turning this into chips and/or mulch. A typical wood chipper is made up of three main parts: a hopper, a chipper unit, and discharge chute. Debris such as branches, etc is manually loaded into the hopper, which in use is set upright at an angle. The debris feeds through the hopper under gravity, into the chipper unit. A typical chipper unit has a set of blades that rotate in a plane at an angle to the feed direction of the wood, so that as the wood/debris enters the chipper unit the blades chop small pieces off the branch or other item as they rotate and the branch is fed into the blades, so that over a short period of time it is cut into small fragments—that is, chipped. Most chipper units have a rotary blade unit, where the blades are connected to or form part of a blade carrier in the form of a bladed disc or short cylinder. The blade carrier rotates so that the blades connect with the wood at an angle as this is fed into the wood chipper.

The chipped wood fragments pass through the chipper unit and out of the wood chipper via the discharge chute.

Typically, the hopper is aligned upright, at an angle between fully horizontal and fully vertical. Branches and debris placed in the hopper will therefore slide down inside the hopper (gravity feed), and enter the chipper at the bottom of the hopper, at an angle to the blades.

For harder woods, it is preferred to use a chipper with the hopper aligned more upright, or closer to vertical. Hardwood or dry wood often requires a pushing force to be exerted to push the wood into the blades of the cutting block of the chipper. The steeper angle helps to ensure that the wood is 'self-feeding' under gravity, and that no or minimal extra force is required form an operator. This 'steeper' angle also means that contact between e.g. a branch and the blades is closer to a right angle (that is, at the point of contact in a chipper having rotating blades, the blades will be travelling near-horizontally at the top part of their route of travel. With the hopper aligned closer to vertical, the wood/blade contact therefore occurs at an angle closer to perpendicular). This arrangement also means that the wood 'drops' faster through the hopper, and enters the chipper unit at a faster speed than it would for a shallower hopper angle. A faster feed, and/or an angle closer to perpendicular, is more advantageous when chipping harder woods.

For softer woods it is preferred to use a chipper with the hopper aligned at a shallower angle/less upright/further away from vertical. Soft wood is easier to cut (chip), and therefore it is less crucial to have the blades and wood meet at an angle closer to a right-angle, and at speed. Also, the chips from softer wood can accumulate very rapidly within the chipper unit and cause clogging and potentially stoppages. For operations where softer woods are being chipped, the hopper is normally aligned at an angle further away from vertical (less upright), so that the wood does not feed under gravity as fast, leading to less volume passing into the chipper over any given or set time period.

U.S. Pat. No. 5,293,917 describes and shows a disc chipper and feeding method, where the method for feeding long pieces of wood into a disc chipper against a disc equipped with blades is carried out in such a way that the piece of wood encounters the bladed disc at a sharp input angle. The sharp input angle is achieved by combining the sharp inclination of the feeder chute with a sharp level slanting angle. This specification discusses issues and advantages with feeding wood into a chipper at different angles.

In this specification where reference has been made to patent specifications, other external documents, or other sources of information, this is generally for the purpose of providing a context for discussing the features of the invention. Unless specifically stated otherwise, reference to such external documents is not to be construed as an admission that such documents, or such sources of information, in any jurisdiction, are prior art, or form part of the common general knowledge in the art.

SUMMARY

It is an object of the present invention to provide a wood chipper which goes some way to overcoming the above-mentioned disadvantages or which at least provides the public or industry with a useful choice.

The term "comprising" as used in this specification and indicative independent claims means "consisting at least in part of". When interpreting each statement in this specification and indicative independent claims that includes the term "comprising", features other than that or those prefaced by the term may also be present. Related terms such as "comprise" and "comprises" are to be interpreted in the same manner.

As used herein the term "and/or" means "and" or "or", or both.

As used herein "(s)" following a noun means the plural and/or singular forms of the noun.

Accordingly, in a first aspect the present invention may broadly be said to consist in a wood chipper, comprising: a hopper, having an inlet end and an outlet end, the hopper configured to receive vegetative debris via the inlet end; a chipper unit having an outer casing and an inlet passing therethrough, the inlet connected to the hopper outlet end to in use receive the vegetative debris within the casing, the chipper unit further comprising a cutting means located within the casing and configured to chip vegetative debris within the chipper unit; the hopper and outer casing configured so that the hopper and outer casing can be moved between a position where the hopper is substantially vertical and a position where the hopper is substantially horizontal.

In an embodiment, the chipper further comprises a discharge chute connected to the chipper unit and configured to receive the chipped vegetative debris and pass this out of the chipper as a stream at a point remote from the chipper unit.

In an embodiment, the chipper further comprises a motor, the motor having an output shaft connected to and driving the cutting means, the hopper and outer casing moving between the position where the hopper is substantially vertical and the position where the hopper is substantially horizontal by rotating around the axis of rotation of the motor output shaft.

In an embodiment, the chipper further comprises a fixed plate connected to the motor and a back plate connected to the chipper unit, the plates adjacent to one another, the back plate in use rotating relative to the fixed plate, apertures formed through the plates and co-incident with each other at the substantially vertical and substantially horizontal positions.

In an embodiment, the apertures comprise three position holes formed through the fixed plate and at least one backplate hole, the backplate hole aligning with each of the three position holes in turn as the hopper and outer casing are rotated between positions.

In an embodiment, the apertures comprise at least one slot formed in one of the plates, co-incident with at least one aperture formed in the other of the plates along the length of the slot as the back plate rotates.

In an embodiment, the slot or slots are formed in the fixed plate.

In an embodiment, the chipper unit is configured so that the inlet is located substantially at the mid-point in use.

In an embodiment, the chipper further comprises a stand, the motor mounted on top of the stand, the hopper and outer casing mounted to the motor adjacent to the motor and adjacent to and above the stand.

In an embodiment, the stand comprises a pair of wheels at one end and a support at the opposite end form the wheels.

With respect to the above description then, it is to be realised that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

This invention may also be said broadly to consist in the parts, elements and features referred to or indicated in the specification of the application, individually or collectively, and any or all combinations of any two or more said parts, elements or features, and where specific integers are mentioned herein which have known equivalents in the art to which this invention relates, such known equivalents are deemed to be incorporated herein as if individually set forth.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

BRIEF DESCRIPTION OF THE FIGURES

Further aspects of the invention will become apparent from the following description which is given by way of example only and with reference to the accompanying drawings which show an embodiment of the device by way of example, and in which.

DETAILED DESCRIPTION

Figure 1:
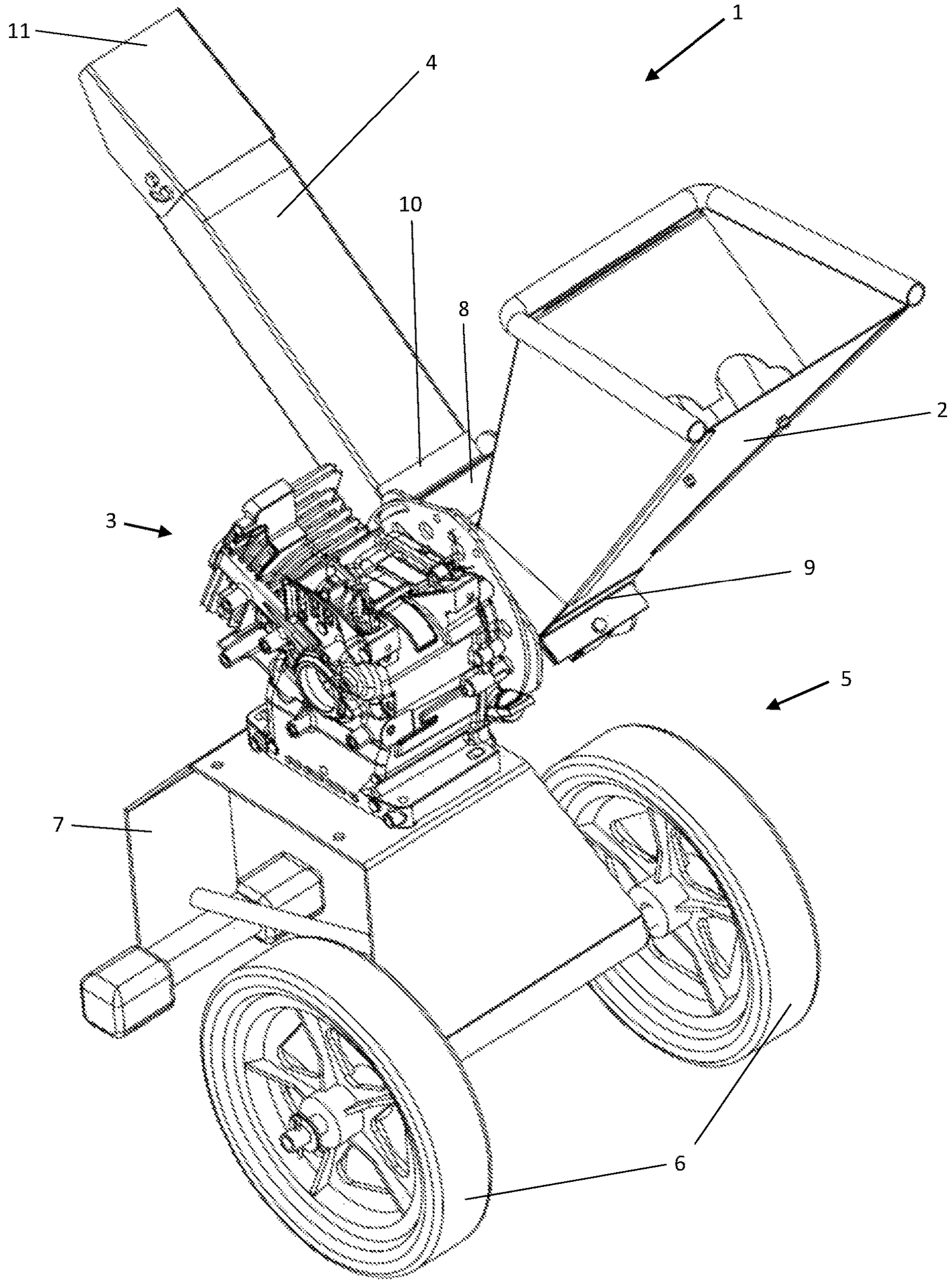
FIG. 1 shows a perspective view to the front and one side of a wood chipper according to an embodiment of the invention, the wood chipper having a hopper, a chipper unit, and discharge chute, the hopper and chipper unit connected via an angle-adjustable coupling that allows the angle of the hopper relative to the horizontal to be altered by rotation of the hopper between close to vertical, and close to horizontal.

Embodiments of the invention, and variations thereof, will now be described in detail with reference to the figures.

In an embodiment, the chipper 1 comprises three main parts or subsections: a hopper 2, a chipper unit 3, and discharge chute 4. These three parts are connected to one another to form a single unit, which is located on a base section 5 that comprises a pair of wheels 6 at one end and a support section 7 at the other end, allowing the chipper 1 to be transported in a similar manner to a wheelbarrow, by lifting the support section up so that it pivots around the axis of the wheels 6, and then wheeling it on the wheels. A motor 12 is mounted on the top of the base section 5 to power the chipper unit 3.

The hopper 2 is configured to receive vegetative debris, and comprises a funnel shape, rectangular in cross-section, between one and two metres long, with a wide, open mouth end large enough to allow medium-sized branches and similar debris to be easily fed into the wide end. The lower end is arranged so that branches and debris passing through the hopper 2 feed into the chipper unit 3.

Figure 6:
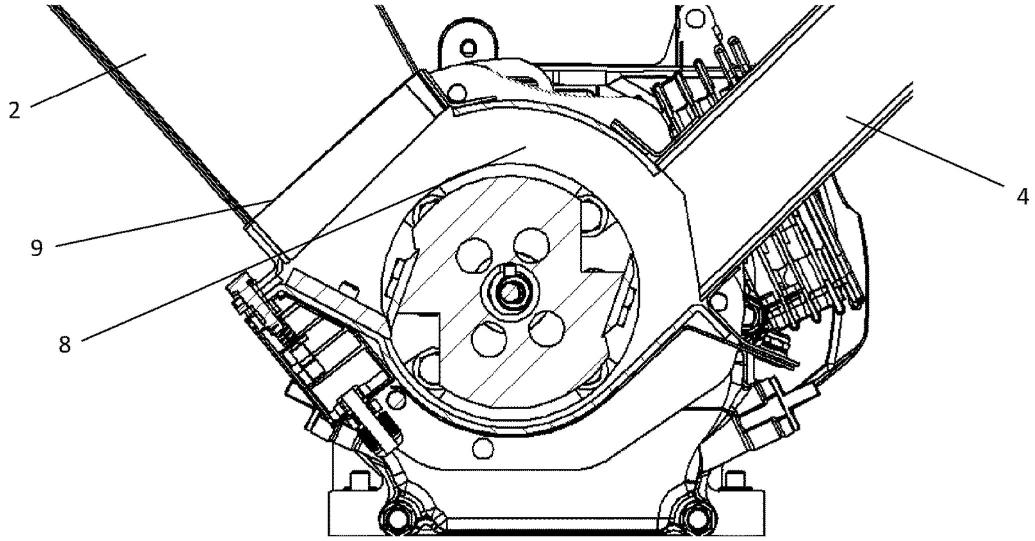
FIG. 6 shows a side on view of an embodiment of wood chipper, showing detail of the angled connection between the hopper and the chipper unit.

The chipper unit 3 comprises an outer casing 8, and a set of rotating blades (not shown) located within and rotating within the housing 8. The casing 8 has an entry aperture 9 and an exit aperture 10. The entry aperture 9 is sized with and connected to the lower/narrower end of the hopper 2, so that branches and debris passing through the hopper 2 feed into the chipper unit 3, at a point substantially midway up the chipper drum. That is, the entry aperture is midway up the chipper drum. This is best shown in FIG. 6.

It has been found that if wood enters towards the bottom of the drum, this can lead to the wood becoming trapped, which can slow down or even stop rotation of the drum. Having an entry aperture at a higher point helps to avoid this. The chipper of the chipper unit is driven by a motor 12, connected to the top of base section 5. The chipper unit 3, along with the hopper 2 and discharge chute 4, is located to one side of the motor 12 and off to one side of the base section 5—that is, offset from the base section 5.

The blades or cutting block are arranged to rotate within the chipper unit so that as branches and debris feed into the chipper unit 3 via the entry aperture 9, the blades hit these at an angle to the direction of travel, chipping pieces of the branch and turning it into chips. The chips pass through and out of the chipper unit 3 via exit aperture 10, and into the discharge chute 4.

A right-angle or close to right angle contact between wood and the blades can be achieved even with the hopper chute at an angle of approximately 45 degrees. The mid-point connection between the chipper and hopper helps to ensure that even with the hopper at this angle, the cutting block will still contact wood entering the chipper at an angle closer to a right angle. This arrangement also helps with dryer woods, which can also be hard to chip. However, it also helps to ensure that the chipper will not 'draw' the wood in too fast—the wood will be drawn in at a speed that allows the chipper to process it without becoming clogged and slowing or stopping the machine. This is best shown in FIG. 6.

The discharge chute 4 comprises a long thin tube, rectangular in cross section and tapering slightly to its outer end, arranged at approximately a 45-degree angle between horizontal and vertical. Chips enter the discharge chute 4 at the inner end, where it is connected to the exit aperture 10 of the chipper unit 3. The chips and other debris are blown along the discharge chute to and through the outer end. A safety cap 11 is connected to the top part of the outer end of the discharge chute 4, at an angle to the axis of the discharge chute, so that as chips are blown out of the discharge chute 4 in a stream, they are directed downwards. A truck or cart or similar can be positioned under the exit aperture, so that this is filled with the chips.

Figure 5:
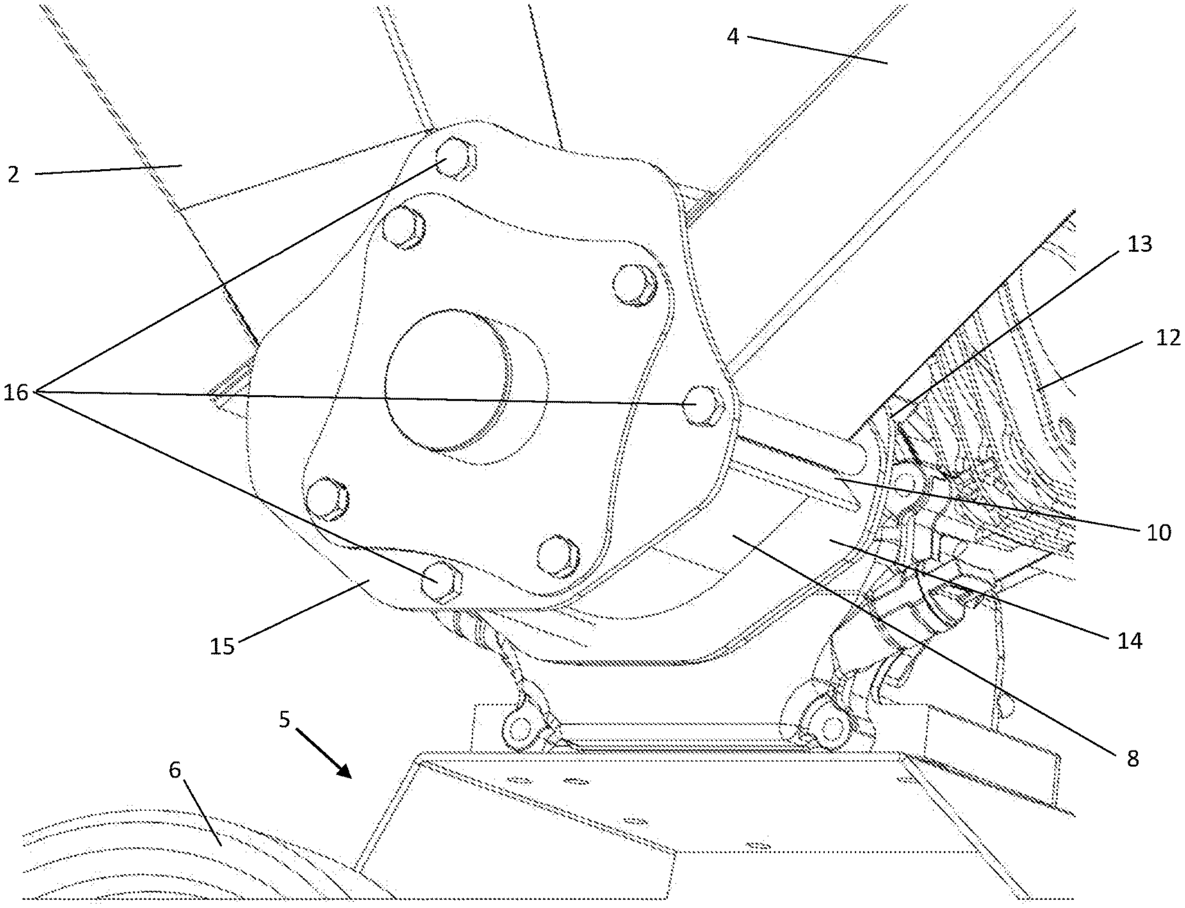
FIG. 5 shows a perspective view from slightly underneath and looking upwards of the embodiment of chipper unit, from the chipper side, showing detail of the connection/rotation mechanism between the motor and the chipper unit.

The hopper 2 and chipper unit 3 are connected to the motor 12 via an angle-adjustable coupling (described in detail below) that allows the hopper 2, chipper unit 3 and discharge chute 4 to be rotated around a substantially horizontally aligned axis of rotation co-incident with the output shaft of the motor 12. That is, the hopper 2 can be rotated between a position close to vertical, and a position close to horizontal, and can be set and locked into position at the two end points (closer to horizontal at one end and closer to vertical at the other), and locked in position at at least one position in between. A combination of a chipper plate or chipper plates 15 and fixing bolts 16 form the outer part of the chipper housing 8, these connected as shown in FIG. 5, to allow the unit to rotate.

This range of adjustment allows a user to choose an angle that particularly suits the type of material they are disposing of. For harder woods, the hopper 2 can be rotated to a more upright/closer to vertical angle, so that the angle at which the material meets the blades is closer to a right angle, and the speed of 'fall' down the chute of the hopper 2 is greater. For softer woods, the hopper 2 can be rotated to a shallower angle closer to horizontal, so that the speed is less, and there is less chance of the wood clogging the chipper unit. The hopper 2 can be rotated to whichever angle is the most suitable, depending on the particular job of the moment.

If the hopper is closer to vertical, this is more suitable as well for material such as loose leaves and vegetative matter. If the exit is closer to horizontal, this will help the leaves etc to exit the hopper.

Figure 2A:
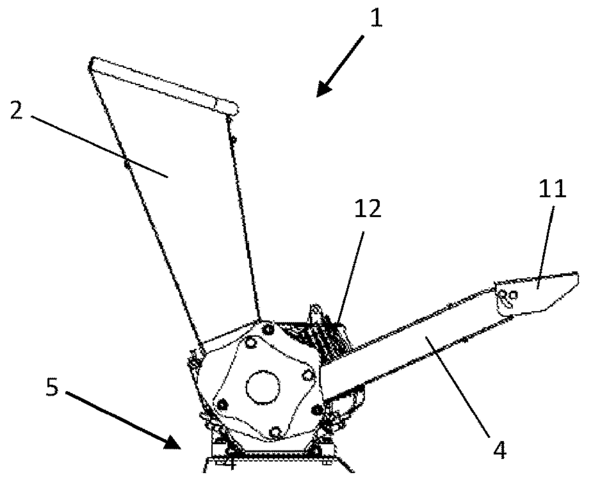
FIGS. 2*a*-2*c* show side views of the wood chipper of FIG. 1 from the chipper side, with the hopper shown rotated to an upright position (closer to vertical) in FIG. 2*a*, a mid-position in FIG. 2*b*, and a downward position (closer to horizontal) in FIG. 2*c*.
Figure 2B:
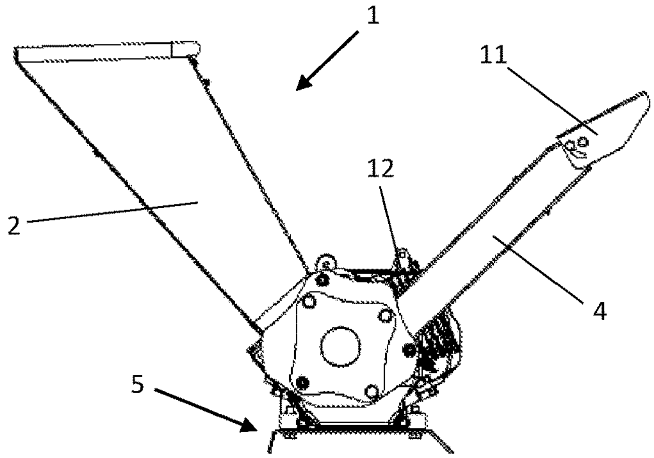
Figure 2C:
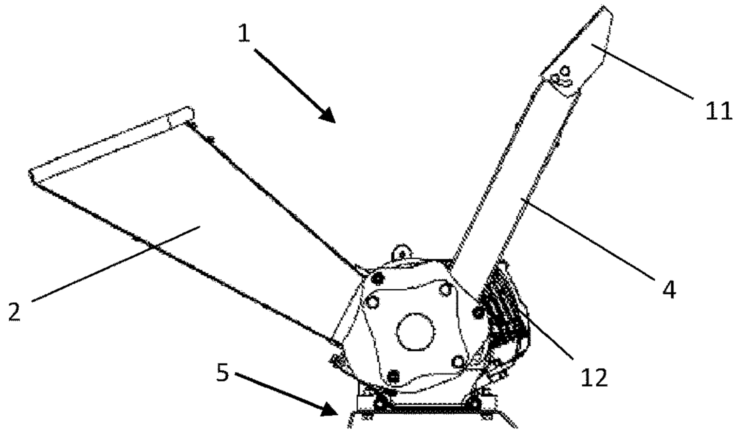

The differences in the angles are shown in FIGS. 2*a* to 2*a*, the hopper shown rotated to an upright position (closer to vertical) in FIG. 2*a*, a mid-position in FIG. 2*b*, and a downward position (closer to horizontal) in FIG. 2*c*.

Figure 3A:
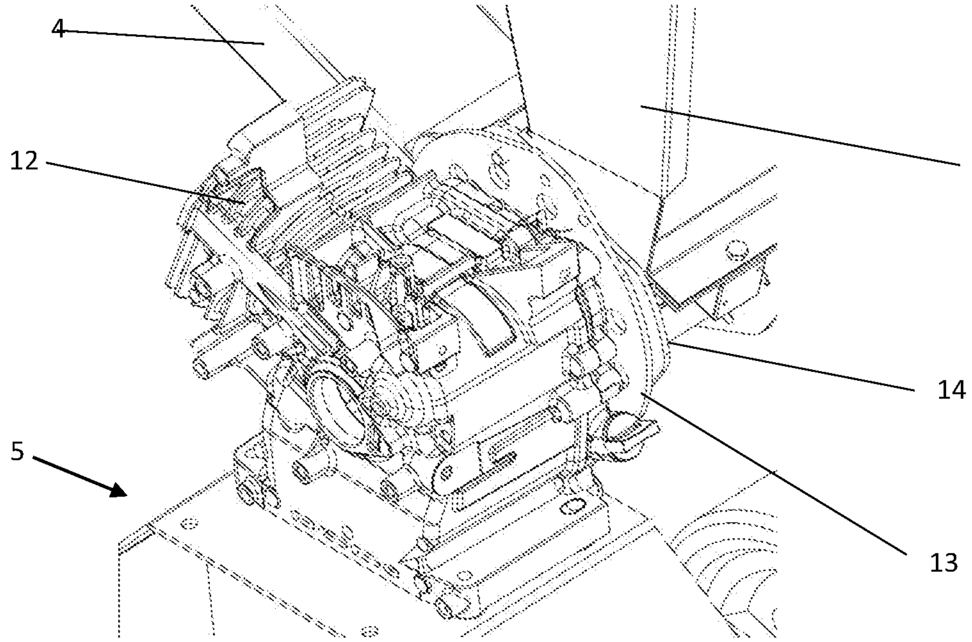
FIGS. 3*a* and 3*b* show a close-up detail perspective views from the side and above of the wood chipper of FIGS. 1 and 2, from the opposite side to the chipper unit, showing detail of a motor connected to the chipper unit to drive blades inside the chipper unit, the hopper shown rotated to an upright position (closer to vertical) in FIG. 3*a* and in a downward position (closer to horizontal) in FIG. 3*b*.
Figure 3B:
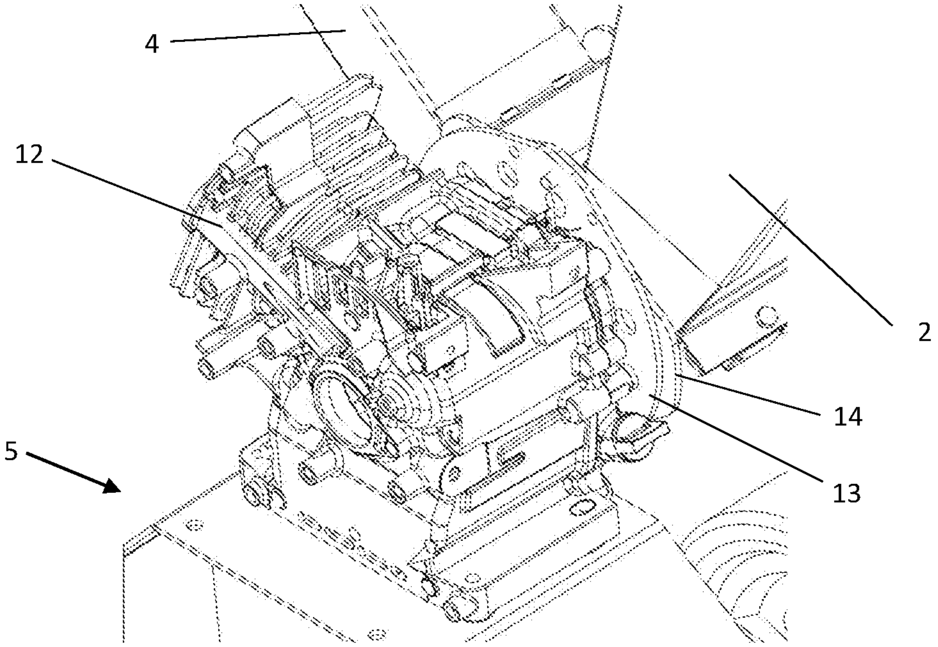

Details of the motor are shown in FIGS. 3*a* and 3*b*, with the hopper shown rotated to an upright position closer to vertical in FIG. 3*a* and in a downward position closer to horizontal in FIG. 3*b*. The motor in the preferred embodiment is a dual-power unit, that can operate independently as a petrol engine, or as a mains-connected electric motor. A close-up of the view of FIG. 3*b* is shown in FIG. 4.

Figure 4:
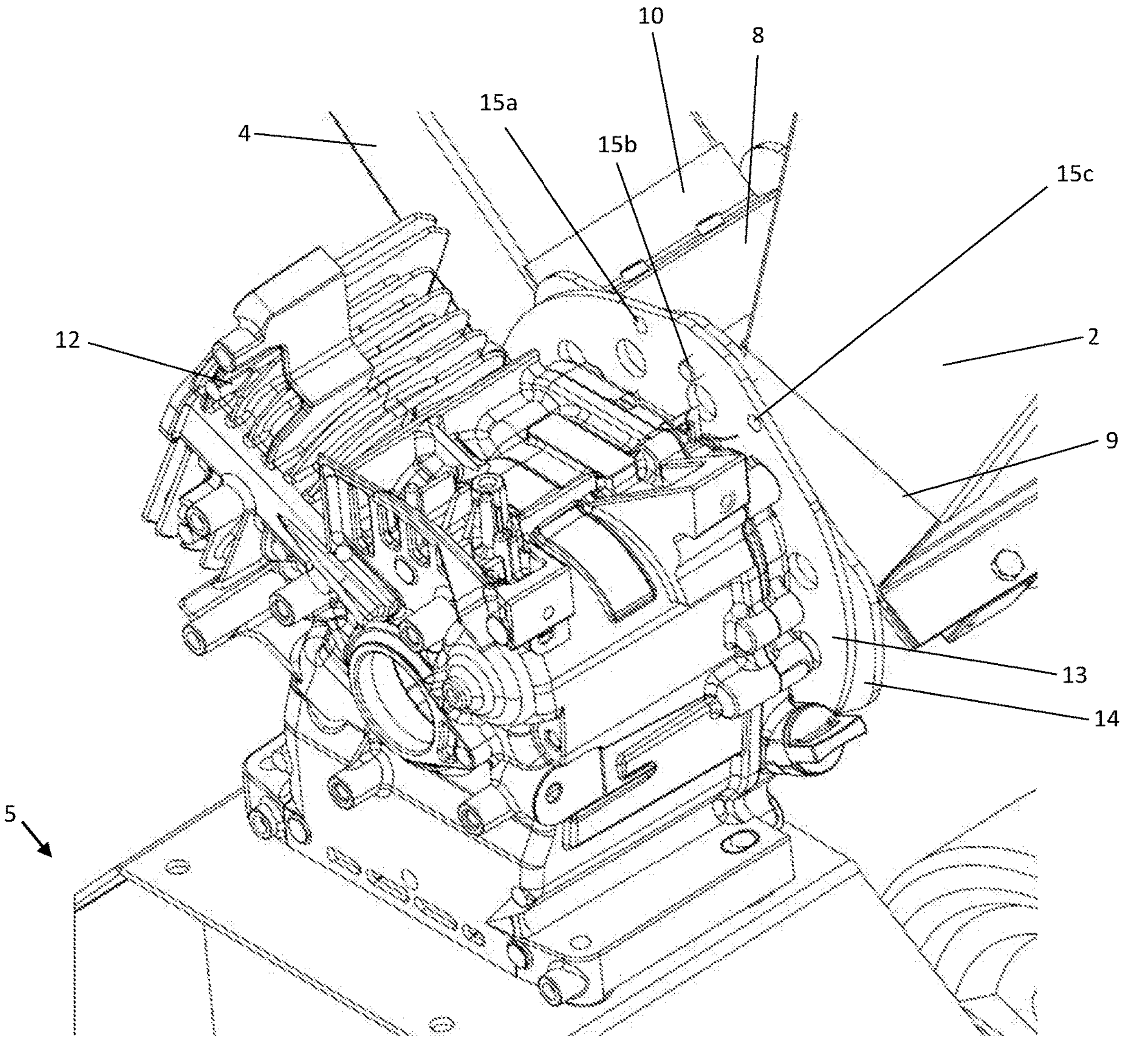
FIG. 4 shows a detail perspective view of the embodiment of wood chipper from the same angle as FIG. 3*b*, showing detail of the motor and the connection/rotation mechanism between the motor and the chipper unit.

Detail of a first embodiment of angle-adjustable coupling are shown in FIG. 4. The chipper unit 3 (and the connected hopper 2 and discharge chute 4) are connected to the motor 12 via the output shaft of the motor 12, which extends horizontally outwards from the motor 12, and also via a pair of plates 13 and 14. Fixed plate 13 is rigidly mounted on the inside of the motor 12 (the same side as the chipper unit 3), the motor 12 rigidly mounted to the top of the base unit 5. The fixed plate 13 is aligned so that a flat face is facing outwards from the motor 12 towards the chipper unit 3, the flat face aligned substantially vertically. Back plate 14 is approximately the same size as the fixed plate 13, and faces outwards from the chipper unit 3 towards the motor 12, aligned so that a flat face is facing towards the motor, outwards from the motor, and substantially vertically. The flat faces of plate 13 and 14, facing towards the chipper unit 3 and motor 12 respectively, are in sliding contact with one another.

The output shaft of the motor 12 passes outwards horizontally from the motor 12, through the two plates, 13 and 14, and towards and into the chipper unit 3. The shaft (not shown) is perpendicular to the flat faces of the two plates 13 and 14. The shaft forms an axis of rotation for the back plate 14 (and therefore the greater chipper unit 3, and the connected hopper 2 and discharge chute 4), and provides at least partial support for the chipper unit 3, the hopper 2 and the discharge chute 4, via a connection with the blades inside the chipper unit 3. Further support is provided as outlined below.

The fixed plate 13 has three position holes 15*a*, 15*b*, and 15*c* passing through it, spaced in an arc across the top part of the plate 13, generally following the perimeter of the plate 13. The back plate 14 has at least one hole formed through it, on its top side, the hole or holes in the back plate 14 positioned so as to be co-incident with a hole or holes 15 in the fixed plate 13 at certain points in the rotation of the back plate. That is, as the back plate 14 rotates around the axis of rotation formed by the shaft of the motor 12, the hole or holes in the back plate 14 pass across and match the holes 15. This allows a bolt or similar to be passed through two coincident holes in the plates, so as to lock the back plate 14 in position relative to the fixed plate 13.

As the hopper 2 and discharge chute 4 are rigidly connected to the chipper unit 3, they will rotate as the back plate 14 is rotated, from a position where the hopper is generally vertically aligned (as shown in FIG. 2*a*) to a position where the hopper is closer to horizontal alignment (as in FIG. 2*c*). The holes in the plates 13, and 14 are arranged so that the hopper 2 and discharge chute 4 can be locked into these end positions by use of a bolt or bolts as described above, and at least one mid-point position (e.g. that shown in FIG. 2*b*). It should be noted that multiple holes, in multiple locations, can be formed and positioned as required, in order to position/angle the apparatus as required.

Figure 7A:
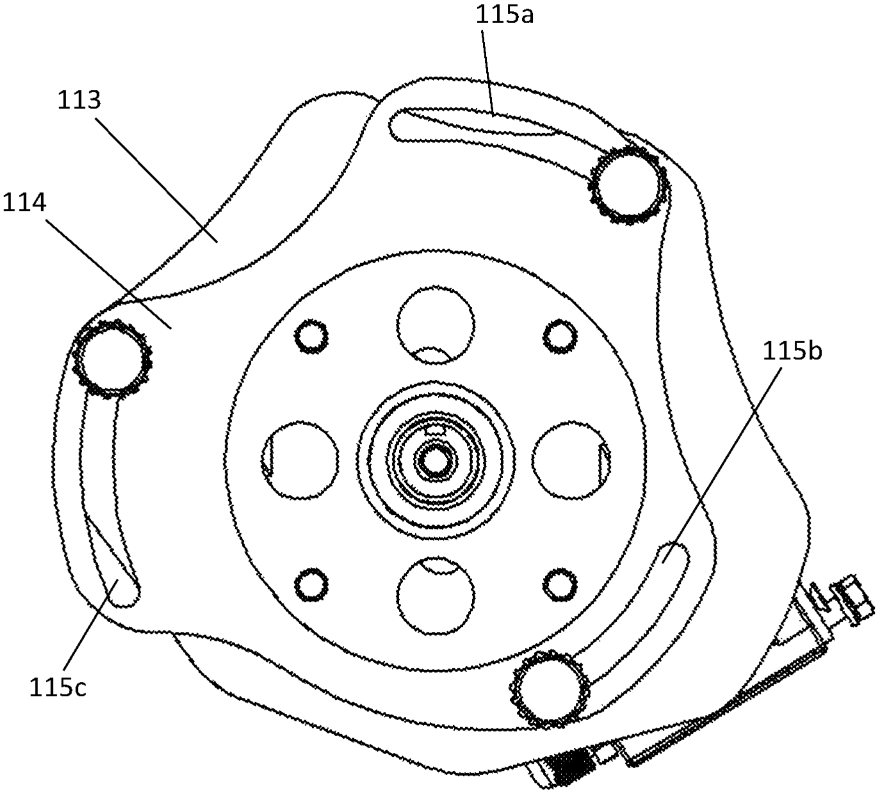
FIGS. 7*a* and 7*b* show side-on views of an alternative form of connection/rotation mechanism between the motor and the chipper unit
Figure 7B:
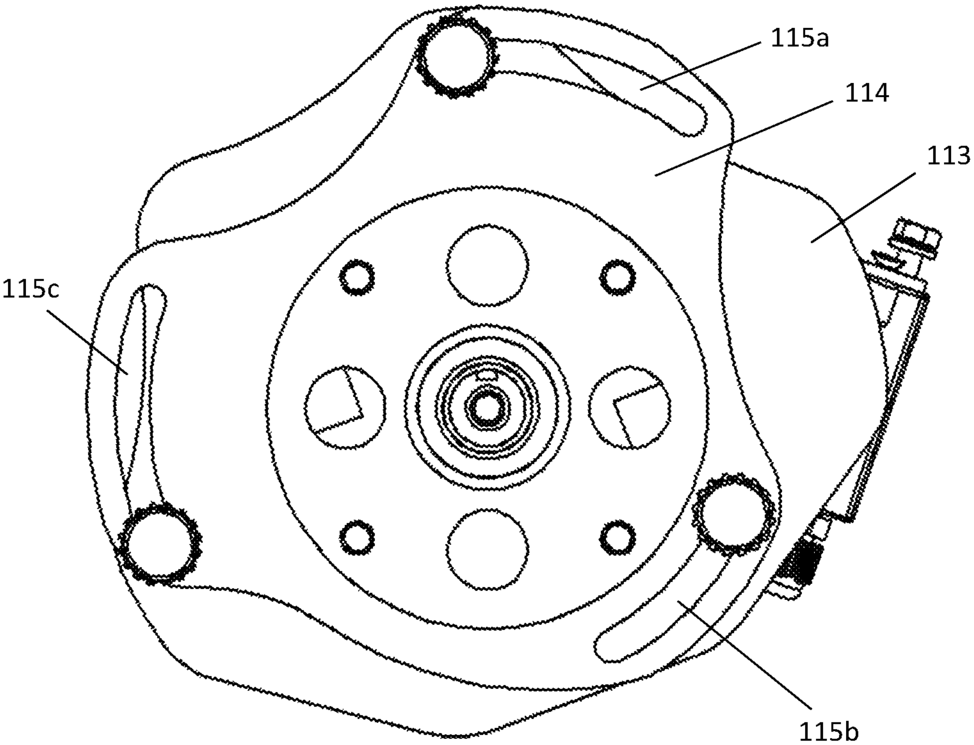

An alternative embodiment of connection/rotation mechanism between the motor and the chipper unit is shown in FIGS. 7*a* and 7*b*. In this embodiment, a slotted back plate 114 is used in place of the back plate 14 of the previous embodiment, the slotted back plate 114 having three position slots 115*a*, 115*b*, 115*c*. The back plate 114 can be rotated along the length of the arc of the slots 115. Nuts/bolts 116 passing through the slots can be tightened to hold the back plate 114 in position relative to the fixed plate 113, or loosened to allow the angle to be adjusted.

The invention claimed is:

1. A chipper comprising:

a hopper having an inlet end and an outlet end, the hopper configured to receive vegetative debris via the inlet end; and a chipper unit having an outer casing and an inlet passing therethrough, the inlet of the chipper unit connected to the outlet end of the hopper to in use receive the vegetative debris within the outer casing, the chipper unit further comprising a cutter located within the casing and configured to chip vegetative debris within the chipper unit;

a motor;

a fixed plate connected to the motor, the fixed plate having apertures formed therethrough; and a back plate connected to the chipper unit, the back plate having apertures formed therethrough, the fixed plate and the back plate being adjacent to one another and the back plate in use rotating relative to the fixed plate, and wherein the hopper and outer casing are configured so that the hopper and outer casing can be moved between a position where the hopper is substantially vertical and a position where the hopper is substantially horizontal, and the apertures formed through the fixed plate and the back plate and co-incident with each other at the substantially vertical and substantially horizontal positions.

2. The chipper as claimed in claim 1 further comprising a discharge chute connected to the chipper unit and configured to receive the chipped vegetative debris and pass the chipped vegetative debris out of the chipper unit as a stream at a point remote from the chipper unit.

3. The chipper as claimed in claim 2, wherein the motor has an output shaft connected to and driving the cutter, the hopper and outer casing moving between the position where the hopper is substantially vertical and the position where the hopper is substantially horizontal by rotating around an axis of rotation of the output shaft.

4. The chipper as claimed in claim 3 wherein the apertures comprise at least three position holes formed through the fixed plate and at least one hole formed through the back plate, the at least one hole formed through the back plate aligning with at least each of the three position holes in turn as the hopper and outer casing are rotated between positions.

5. The chipper as claimed in claim 3 wherein the apertures comprise at least one slot formed in one of the plates, co-incident with at least one aperture formed in the other of the plates along a length of the slot as the back plate rotates.

6. The chipper as claimed in claim 5 wherein the at least one slot is formed in the fixed plate.

7. The chipper as claimed in claim 1 wherein the chipper unit is configured so that the inlet of the chipper unit is located substantially at a mid-point between the substantially vertical and substantially horizontal positions in use.

8. The chipper as claimed in claim 6 further comprising a stand, wherein the motor is mounted on top of the stand, and the hopper and the outer casing are mounted to the motor adjacent to the motor and adjacent to and above the stand.

9. The chipper as claimed in claim 8 wherein the stand comprises a pair of wheels at one end and a support at the opposite end.

10. The chipper as claimed in claim 1 wherein the cutter comprises at least one blade configured to rotate within the outer casing of the chipper unit.

11. The chipper as claimed in claim 1, the wherein the motor has an output shaft connected to and driving the cutter, the hopper and outer casing moving between the position where the hopper is substantially vertical and the position where the hopper is substantially horizontal by rotating around an axis of rotation of the output shaft.

12. The chipper as claimed in claim 11 wherein the apertures comprise at least three position holes formed through the fixed plate and at least one hole formed through the back plate, the at least one hole formed through the back plate aligning with at least each of the three position holes in turn as the hopper and outer casing are rotated between positions.

13. The chipper as claimed in claim 11 wherein the apertures comprise at least one slot formed in one of the plates, co-incident with at least one aperture formed in the other of the plates along the length of the slot as the back plate rotates.

14. The chipper as claimed in claim 13 wherein the at least one slot is formed in the fixed plate.

15. The chipper as claimed in claim 11 wherein the chipper unit is configured so that the inlet of the chipper unit is located substantially at a mid-point between the substantially vertical and substantially horizontal positions in use.

16. The chipper as claimed in claim 11 further comprising a stand, wherein the motor is mounted on top of the stand, and the hopper and the outer casing are mounted to the motor adjacent to the motor and adjacent to and above the stand.

17. The chipper as claimed in claim 1 wherein the apertures comprise at least three position holes formed through the fixed plate and at least one hole formed through the back plate, the at least one hole formed through the back plate aligning with at least each of the three position holes in turn as the hopper and outer casing are rotated between positions.

* * * * *